(12) United States Patent
Terada et al.

(10) Patent No.: US 6,228,240 B1
(45) Date of Patent: *May 8, 2001

(54) METHOD AND APPARATUS FOR PRODUCING DEIONIZED WATER

(75) Inventors: Ichiro Terada, Yokohama; Hiroshi Toda, Ichihara; Junjiro Iwamoto, Yokohama; Kazuo Umemura, Yokohama; Ken Komatsu, Yokohama; Tohru Hoshi, Yokohama, all of (JP); Mark Philip Huehnergard, Guelph (CA); David Florian Tessier, Guelph (CA); Ian Glenn Towe, Guelph (CA)

(73) Assignees: Asahi Glass Company Ltd., Tokyo (JP); Glegg Water Conditioning, Incorporated, Guelph (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/338,570

(22) Filed: Jun. 23, 1999

Related U.S. Application Data

(62) Division of application No. 08/952,218, filed as application No. PCT/JP97/00896 on Mar. 19, 1997, now Pat. No. 5,961,805.

(30) Foreign Application Priority Data

Mar. 21, 1996 (JP) .......................................................... 8-64783
Feb. 7, 1997 (JP) .......................................................... 9-40026

(51) Int. Cl.[7] .................................................. B01D 61/48
(52) U.S. Cl. ............................................. 204/632; 204/524
(58) Field of Search ..................................... 204/524, 529, 204/632

(56) References Cited

U.S. PATENT DOCUMENTS

| | | |
|---|---|---|
| 2,854,394 | 9/1958 | Kollsman . |
| 2,943,989 | 7/1960 | Kollsman . |
| 3,149,062 | 9/1964 | Gottschal et al. . |
| 3,755,135 | 8/1973 | Johnson . |
| 4,033,850 | 7/1977 | Kedem et al. . |
| 4,632,745 | 12/1986 | Giuffrida et al. . |
| 4,849,102 | 7/1989 | Latour et al. . |
| 5,066,375 | 11/1991 | Parsi et al. . |
| 5,176,828 | 1/1993 | Proulx . |
| 5,308,467 | 5/1994 | Sugo et al. . |
| 5,425,866 | 6/1995 | Sugo et al. . |
| 5,536,387 | 7/1996 | Hill et al. . |
| 5,558,753 | 9/1996 | Gallagher et al. . |
| 5,584,981 | 12/1996 | Turner et al. . |
| 5,759,373 | 6/1998 | Terada et al. . |
| 5,961,805 | * 10/1999 | Terada et al. ........................ 204/524 |

FOREIGN PATENT DOCUMENTS

| | | |
|---|---|---|
| 629790 | 10/1992 | (AU) . |
| 621072 | 10/1994 | (EP) . |
| 776469 | 6/1957 | (GB) . |
| 877239 | 9/1961 | (GB) . |
| 880344 | 10/1961 | (GB) . |
| 942762 | 11/1963 | (GB) . |
| 1048026 | 11/1966 | (GB) . |
| WO 9532052 | 11/1995 | (WO) . |
| WO 9622162 | 7/1996 | (WO) . |

* cited by examiner

Primary Examiner—Arun S. Phasge
(74) Attorney, Agent, or Firm—Oblon, Spivak, McClelland, Maier & Neustadt, P.C.

(57) ABSTRACT

An apparatus for producing deionized water consisting essentially of an electrodialyzer having cation exchange membranes and anion exchange membranes alternately arranged between a cathode and an anode to form demineralizing compartments and concentrating compartments, and ion exchangers accommodated in the demineralizing compartments, wherein a pressure of from 0.1 to 20 kg/cm$^2$ is exerted between the ion exchangers accommodated in the demineralizing compartments and the cation exchange membranes and anion exchange membranes defining the demineralizing compartments.

11 Claims, 4 Drawing Sheets

METHOD AND APPARATUS FOR PRODUCING DEIONIZED WATER

This application is a division of application Ser. No. 08/952,218 filed on Nov. 21, 1997 now U.S. Pat. No. 5,961,805, which was filed as 371 International Application PCT/JP97/00896, on Mar. 19, 1997.

TECHNICAL FIELD

The present invention relates to a method and an apparatus for producing deionized water, which are useful for producing pure water or ultrapure water useful for the production of pharmaceuticals or semiconductors or water for boilers for power generation.

BACKGROUND ART

As a method for producing deionized water, it is common to employ a method of obtaining deionized water by passing water to be treated through a packed bed of ion exchange resins so that impurity ions are removed as adsorbed on the ion exchange resin. Here, it is common to employ a method of regenerating the ion exchange resin having its adsorbing ability lowered, by means of an acid or alkali. However, such a method has a problem that a waste liquid of the acid or alkali used for the regeneration, is discharged. Therefore, a method for producing deionized water which requires no such regeneration is desired. From such a viewpoint, an attention has been drawn in recent years to a self-regenerating type electrodialytic deionized water producing method wherein ion exchange resins are used in combination with ion exchange membranes. This method is a method wherein a mixture of an anion exchange resin and a cation exchange resin is packed in demineralizing compartments of an electrodialyzer having anion exchange membranes and cation exchange membranes alternately arranged, and while supplying water to be treated to the demineralizing compartments, a voltage is applied to carry out electrodialysis to produce deionized water. In this method, it is common that the ion exchange resins in a wet condition are accommodated in the demineralizing compartments, whereby there have been drawbacks that the contact among the ion exchange resins to one another or between the ion exchange resins and the ion exchange membranes, is inadequate, and if it is attempted to increase the thickness of the mineralizing compartments to reduce the effective membrane area, electrical resistance tends to increase.

As a method for overcoming these drawbacks, it has been proposed to prevent the increase of the resistance by adjusting the width of each demineralizing compartment to a level of from about 0.762 to 10.16 cm (from about 0.3 to 4 inches) and the thickness to a level of from about 0.127 to 0.635 cm (from about 0.05 to 0.25 inch) in JP-B-4-72567 and JP-B-6-20513. However, this method has had drawbacks that since the thickness of the demineralizing compartment is thin, it is difficult to pack the ion exchanger into the demineralizing compartment, and the amount of water produced per unit area is small.

DISCLOSURE OF INVENTION

It is an object of the present invention to provide a novel apparatus for producing deionized water whereby, in a self-regenerating type electrodialytic deionized water producing apparatus wherein ion exchangers and ion exchange membranes are used in combination, the increase of electrical resistance is small even if the thickness of a demineralizing compartment is made thick, and pure water can be constantly obtained over a long period of time without the above-mentioned drawbacks of the prior art, and to provide a method for producing deionized water by using such an apparatus.

The present invention provides an apparatus for producing deionized water comprising an electrodialyzer having cation exchange membranes and anion exchange membranes alternately arranged between a cathode and an anode to form demineralizing compartments and concentrating compartments, and ion exchangers accommodated in the demineralizing compartments, wherein a pressure of from 0.1 to 20 $kg/cm^2$ is exerted between the ion exchangers accommodated in the demineralizing compartments and the cation exchange membranes and anion exchange membranes defining the demineralizing compartments.

BEST MODE FOR CARRYING OUT THE INVENTION

Figure 1:
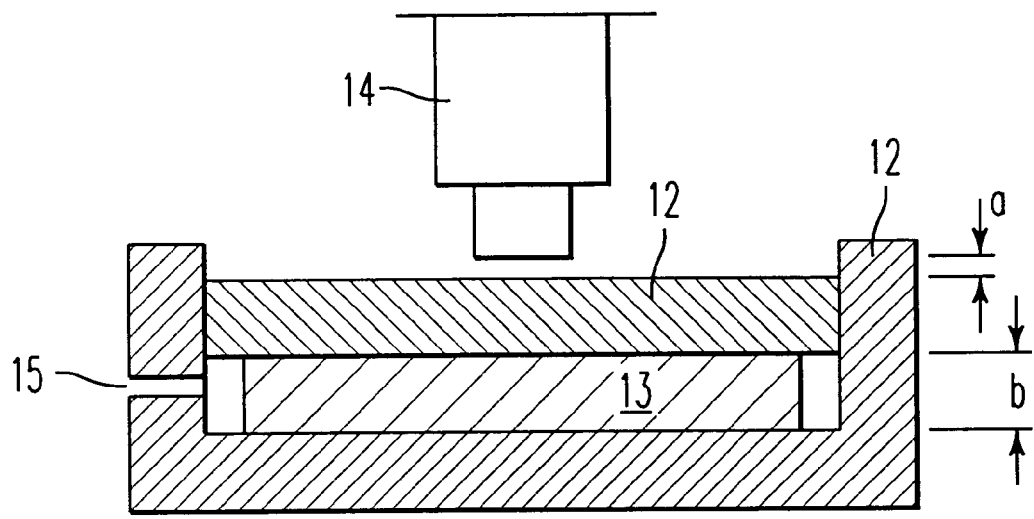
FIG. 1 is a view illustrating a method for measuring the pressure between an ion exchanger and a container wall.

In the present invention, the ion exchanger may have its state preliminarily changed and then put into the demineralizing compartments of the electrodialyzer, or may be put into the demineralizing compartments and then have its state changed. In this specification, the state of the ion exchanger will hereinafter be described by using the following terms. Namely, the term "operation state" means a state where the ion exchanger is accommodated in the demineralizing compartments and is used for electrodialysis, and it is in equilibrium with the environment for operation. The term "shrinked state" means a state where the apparent volume of the ion exchanger is shrinked by some method. The term "free state" means a state where the ion exchanger is in equilibrium with the environment for operation, but is free from restriction by the demineralizing compartments.

In the present invention, the thickness of each demineralizing compartment is usually at least 0.2 cm, preferably at least 0.7 cm. If the thickness of the demineralizing compartment is less than 0.2 cm, the effect of reducing the effective membrane area tends to be indistinct, and it tends to be difficult to pack the ion exchanger therein. On the other hand, if its thickness exceeds 80.0 cm, the effect of reducing the effective membrane area is large, but the increase of electrical resistance tends to be large, such being undesirable. It is particularly preferred that the thickness of the demineralizing compartment is within a range of from 1.1 to 30.0 cm, whereby the increase of the resistance is small, and the effect of reducing the effective membrane area is large.

The pressure formed between the ion exchangers accommodated or packed in the demineralizing compartments and the cation exchange membranes and anion exchange membranes defining the demineralizing compartments, is adjusted within a range of from 0.1 to 20 kg/cm$^2$. If the pressure is less than 0.1 kg/cm$^2$, the contact of the ion exchanger particles to one another or between the ion exchangers and the ion exchange membranes tends to be inadequate, whereby electrical resistance is likely to increase, or a short path of water to be treated is likely to form and the purity of the resulting water tends to be low, such being undesirable. On the other hand, if the pressure exceeds 20 kg/cm$^2$, the contact of the ion exchange resin particles to one another or between the ion exchangers and the ion exchange membranes will be adequate, but the amount of water treated tends to decrease, and the ion exchange membranes used, are likely to be damaged by the pressure. The above pressure is preferably from 0.5 to 10 kg/cm$^2$, more preferably from 0.8 to 2 kg/cm$^2$.

In the present invention, the pressure may be formed between the ion exchangers packed in the demineralizing compartments and the ion exchange membranes preferably in such a manner that (1) the ion exchangers to be accommodated in the demineralizing compartments are converted to a form having their volume reduced smaller than the volume of their regenerated form and then packed in the demineralizing compartments in an amount such that the volume of the regenerated form of the ion exchanger in a free state would be larger than the volume of the demineralizing compartments, followed by supplying water and conducting an electric current to let the ion exchanger expand to increase the volume thereby to increase the pressure, or (2) the ion exchanger is accommodated in the demineralizing compartments, and then the volume of the demineralizing compartments is mechanically reduced to increase the pressure.

In the above manner (1), it is preferred that the ion exchanger is packed in the demineralizing compartments in an amount such that the volume of the ion exchangers in the regenerated form in a free state would be from 103 to 170% relative to the volume of the demineralizing compartments. If this amount is less than an amount for a free state volume of 103%, the contact of the ion exchangers tend to be poor. On the other hand, if the amount exceeds an amount for a free volume of 170%, the contact will be good, but the pressure loss in passing water through the ion exchangers tend to be large, such being undesirable. Among them, it is particularly preferred that the amount of the ion exchangers are such that the free state volume would be from 111 to 150% of the volume of the demineralizing compartments.

As a method for reducing the volume of the ion exchanger to a level smaller than the volume of its regenerated form, (i) a method of reducing the water content by drying, (ii) a method of changing the counter ion to an ion species for other than the regenerated form to convert the ion exchanger to a loaded form, or (iii) a method of immersing the ion exchanger in an organic solvent for solvent substitution, may be mentioned. However, a method for using the method (i) and the method (ii) in combination, is preferred, since it can readily be applied irrespective of the kind or structure of the ion exchanger, and the volume decreasing amount is large.

When the water content is to be reduced by drying, it is preferred to reduce the water content (weight) to a level of from 1 to 30%. If the water content is less than 1%, it takes a long time for drying, such being undesirable. If the water content is larger than 30%, the effect for increasing the volume by supplying water and conducting an electric current tends to be small, such being undesirable. It is particularly preferred that the water content is from 5 to 15%, whereby drying will be easy, and the effect for increasing the volume by supplying water and conducting an electric current will be large. As the type of the counter ion during drying, a Na type is preferred for a cation exchanger, and a Cl type is preferred for an anion exchanger, since such type is thermally stable. The drying temperature is preferably from 30 to 80° C. If it is lower than 30° C., it takes a long time for drying, and if it is higher than 80° C., the ion exchange groups tend to decompose, such being undesirable.

In the case of a method of changing the counter ion to an ion species for other than the regenerated form to convert the ion exchanger to a loaded form, a Na type is preferred for a cation exchanger, and a Cl type is preferred for an anion exchanger, as mentioned above. As other ion species, a K type or a Li type is preferred for a cation exchanger, and a monovalent counter ion such as a NO$_3$ type is preferred for an anion exchanger. In this respect, a Ca type or an Al type, or bivalent or higher valent counter ion such as a SO$_4$ type, is not preferred, since the conversion to a regenerated form tends to be not easy.

In the above-mentioned method (2) wherein the ion exchangers are packed in the demineralizing compartments, and then the volume of the demineralizing compartments is mechanically reduced to increase the pressure, it is preferred to interpose a spacer which is shrinkable by pressure between demineralizing compartment frames and the ion exchange membranes, and exerting pressure from outside to compress the spacer after packing the ion exchangers, so that the volume of the demineralizing compartments is reduced by from 5 to 60 vol %. If the reduced volume of the demineralizing compartments is less than 5 vol %, the contact of the accommodated ion exchangers tend to be poor. On the other hand, if the reduced volume of the demineralizing compartments exceeds 60 vol %, the contact will be good, but the pressure loss when water is passed through the ion exchanger tends to be large, such being undesirable. As the material for such shrinkable spacer, a foam sheet of e.g. polyethylene, polypropylene or polystyrene, is preferably employed.

In the present invention, the ion exchangers to be accommodated in the demineralizing compartments, may, for example, be an ion exchange resin, an ion exchange fiber or a formed product thereof. Among them, an ion exchange resin and a porous ion exchanger prepared by bonding ion exchange resin particles with a binder polymer into a sheet or a plate, are preferred from the viewpoint of the ion exchange performance, durability, etc. Particularly preferred is a porous ion exchanger sheet, since the contact of the ion exchange resin particles in itself is good, and it can readily be accommodated into the demineralizing compartments.

The porosity of the ion exchanger as it is accommodated in the demineralizing compartments, is preferably such that the continuous porosity governing passage of the liquid is at least 5 vol %. If the porosity is less than 5 vol %, the flow rate of the liquid decreases, and the pressure loss increases, such being undesirable. It is particularly preferred that the porosity is from 10 to 40 vol %, since the water permeation will be good, the demineralizing performance will be excellent, and treated water with a high purity can be obtained. This porosity is the value when the ion exchangers are accommodated in the demineralizing compartments and water is supplied and an electric current is conducted.

As the ion exchanger, a cation exchanger, an anion exchanger or a mixture thereof, or a porous formed product thereof, can be employed. The ion exchanger may have a structure in which domains (regions) of a cation exchanger and domains (regions) of an anion exchanger are combined. In such a case, the patterns of the respective domains which are in contact with the ion exchange membranes, may be various patterns. For example, a sea-island pattern, a layered pattern, a mosaic pattern or a lattice pattern may be employed. Particularly preferred is a sea-island pattern or a layered pattern, since the ion exchanger with such a pattern can readily be accommodated into the demineralizing compartments, and demineralization can efficiently be carried out. However, the overall proportions of the cation exchanger and the anion exchanger used are preferably such that the total ion exchange capacity ratio of the cation exchanger/the anion exchanger is within a range of from 20/80 to 80/20.

When a porous ion exchanger is used as the ion exchanger, the weight ratio of the binder polymer based on the porous ion exchanger is preferably at most 20%. If the weight ratio exceeds 20%, the binder polymer is likely to cover the surface of the ion exchange resin particles, whereby the adsorbing ability tends to be low, and the porosity tends to be low, whereby the flow rate of the liquid to be treated tends to decrease, and the pressure loss tends to increase. The above weight ratio is particularly preferably from 1 to 5%. The binder polymer is preferably a thermoplastic polymer or a solvent-soluble polymer from the viewpoint of the preparation of the porous ion exchanger.

As such a binder polymer, the following is preferably employed. Firstly, as the thermoplastic polymer, a low density polyethylene, a linear low density polyethylene, an ultra high molecular weight high density polyethylene, a polypropylene, a polyisobutylene, 1,2-polybutadiene, a polyvinyl acetate or an ethylene-vinylacetate copolymer may, for example, be mentioned. As the solvent-soluble polymer, natural rubber, butyl rubber, polyisoprene, polychloroprene, a styrene-butadiene rubber, nitrile rubber or a vinyl chloride-fatty acid vinyl ester copolymer may, for example, be mentioned.

The thickness of the porous sheet having the ion exchange resin particles bound by the binder polymer, is preferably such that the thickness in a form having the volume reduced for packing into the demineralizing compartment will be from 50 to 100% of the thickness of the demineralizing compartment. If this thickness is less than 50% of the thickness of the demineralizing compartment, the porous sheet will not closely contact with the ion exchange membranes when water is supplied and an electric current is conducted, such being undesirable. If the thickness exceeds 100%, such a sheet can not be accommodated in the demineralizing compartment. The thickness of the porous sheet in a form having the volume reduced is particularly preferably from 70 to 90% of the thickness of the demineralizing compartment.

The following method is preferred as a method for binding the ion exchange resin particles by the binder polymer to form a porous sheet. Namely, preferred is (1) a method wherein ion exchange resin particles and a binder polymer are heat-kneaded and then formed into a sheet by thermal forming such as flat plate pressing, (2) a method wherein a binder polymer solution is coated on the surface of the ion exchange resin particles, and the solvent is evaporated for curing the binder polymer, (3) a method wherein a binder polymer, a pore-forming material and ion exchange resin particles are heat-mixed and sheeted and then the pore-forming material is extracted, or (4) a method wherein a binder polymer having a pore-forming material dispersed therein, is coated on the surface of ion exchange resin particles and cured, and then the pore-forming material is extracted. Among them, method (1) and the method (3), are preferred from the viewpoint of the forming processability or the specific resistance of the obtained porous ion exchanger.

The ion exchange groups of the ion exchanger are preferably a strongly acidic sulfonic acid type for cation exchange groups and a strongly basic quaternary ammonium salt type or pyridinium salt type for anion exchange groups from the viewpoint of the ion exchange performance and the chemical stability. The ion exchange capacity of the ion exchanger is preferably from 0.5 to 7 meq/g dry resin. If the ion exchange capacity is lower than 0.5 meq/g dry resin, adsorption of ions or demineralization in the demineralizing compartments will not sufficiently be carried out, whereby the purity of treated water is likely to be low, such being undesirable. It is particularly preferred that the ion exchange capacity is from 1 to 5 meq/g dry resin, whereby treated water with a high purity can be obtained, and the stability in performance will be excellent.

In the present invention, as an apparatus for producing deionized water, it is preferred to use an electrodialyzer having the following construction, as described in e.g. JP-A-3-186400, JP-A-2-277526, JP-A-5-64726, U.S. Pat. No. 4,632,745 and U.S. Pat. No. 5,425,866.

The electrodialyzer comprises an anode compartment provided with an anode and a cathode compartment provided with a cathode, and a plurality of cation exchange membranes and anion exchange membranes which are alternately arranged between the anode compartment and the cathode compartment preferably via compartment frames to form demineralizing compartments each defined by an anion exchange membrane on the anode side and by a cation exchange membrane on the cathode side, and concentrating compartments each defined by a cation exchange membrane on the anode side and by an anion exchange membrane on the cathode side, alternately, preferably in a total number of from 2 to 50 units. The thickness of a picture frame-like compartment frame having an opening at its center, which is present between a cation exchange membrane and an anion exchange membrane, determines the thickness of the demineralizing compartment or the concentrating compartment. The thicknesses of the compartment frames of the demineralizing compartment and the concentrating compartment may not necessarily be the same. The ion exchange membranes may be of a homogeneous type or a heterogeneous type, and in order to increase the mechanical strength, the one reinforced by a woven fabric or a non-woven fabric, may be used. In a concentrating compartment, it is preferred to insert a spacer of a network-form, preferably made of a plastic, in order to maintain the thickness of the concentrating compartment preferably thinner than the thickness of the demineralizing compartment and within a range of preferably from 0.05 to 10 cm. Demineralization can be carried out by conducting an electric current while supplying water to be treated to the demineralizing compartments and supplying water to the concentrating compartments to discharge the concentrated salts. To each unit cell, a voltage of from 4 to 20 V is applied to conduct an electric current preferably at a current density of from 0.00001 to 0.05 A/cm$^2$.

Figure 3:
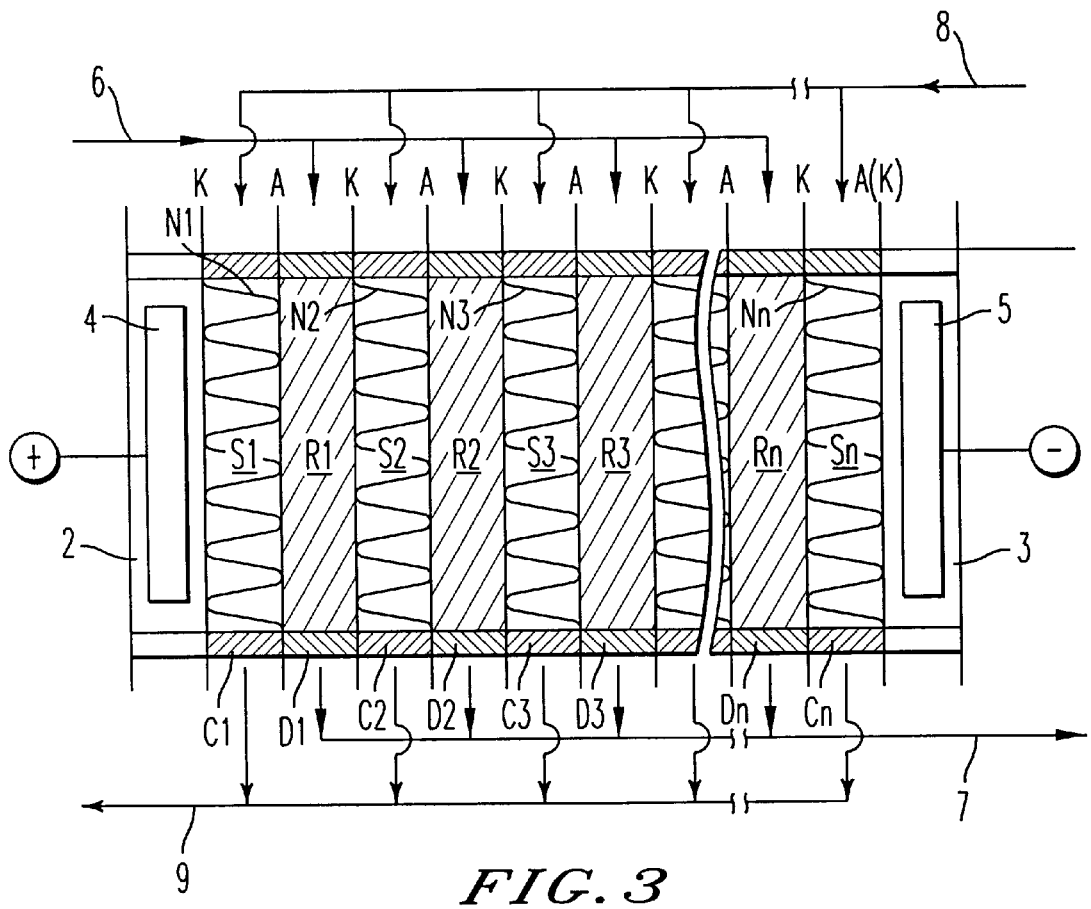
FIG. 3 is a schematic view illustrating an embodiment of a self-regenerating type electrodialytic apparatus.

FIG. 3 is a schematic view illustrating an embodiment of an electrodialyzer of such a type. In FIG. 3, A is an anion exchange membrane, and K is a cation exchange membrane. As shown, the anion exchange membranes A and the cation exchange membranes K are arranged in the electrodialyzer 1 via demineralizing compartment frames D1, D2, D3 . . .

Dn and concentrating compartment frames C1, C2, C3 . . . Cn at predetermined distances, to form an anode compartment 2, concentrating compartments S1, S2 . . . Sn, demineralizing compartments R1, R2 . . . Rn and a cathode compartment 3. In the demineralizing compartments R1, R2 . . . Rn, anion and cation exchange resins are accommodated or packed. In the concentrating compartments, spacers N1, N2, N3 . . . Nn are inserted.

In FIG. 3, reference numeral 4 indicates an anode and numeral 5 indicates a cathode, and a predetermined voltage is applied across the two electrodes during the operation, whereby anions in water to be treated which is introduced into the demineralizing compartments R1, R2 . . . Rn from a conduit 6, will permeate and move to a concentrating compartment on the anode side through an anion exchange membrane A, while cations in water to be treated will permeate and move to a concentrating compartment on the cathode side through a cation exchange membrane K, and water to be treated itself will be deionized and discharged via a conduit 7. Further, water or an aqueous solution is introduced into the respective concentrating compartments S1, S2 . . . Sn from a conduit 8, and the anion and cation components permeated and moved as described above, will be collected and discharged as a concentrated solution from a conduit 9. Cations in the water to be treated, which are captured by the cation exchangers in a demineralizing compartments, will have a driving force given by the electric field, will reach cation exchange membranes via cation exchangers which are in contact with the cation exchangers which captured the cations, and further, they will pass through the membranes and move to a concentrating compartments. Likewise, anions in the water to be treated which are captured by the anion exchangers will move to a concentrating compartments via an anion exchangers and an anion exchange membranes. Accordingly, it is more preferred that the cation exchanger and the anion exchanger are, respectively, gathered to form domains or gathered regions, whereby contact points of exchanger particles of the same ion type increase remarkably, so that movement of ions is facilitated, and the deionization performance will be improved.

Now, the present invention will be described in further detail with reference to Examples. However, it should be understood that the present invention is by no means restricted to such specific Examples.

TEST EXAMPLE

Preparation of Ion Exchangers

A spherical cation exchange resin (Diaion SK1B, tradename, Mitsubishi Chemical Corporation) having an average diameter of 500 μm and a spherical anion exchange resin (Diaion SA10A, tradename, manufactured by Mitsubishi Chemical Corporation) having an average diameter of 500 μm were mixed in a volume ratio of 50/50 and dried at 50° C. By the drying, the weight of the mixture decreased to 55 wt % of the original weight. As a binder, a linear low density polyethylene used in Example 2 mentioned below of a pellet form having a diameter of from 2 to 6 mm and a length of from 4 to 9 mm, was added in an amount shown in Table 1 as the amount of the binder to the total amount of the binder and the ion exchange resins, and the mixture was kneaded by a kneader at 140° C. for 40 minutes. This kneaded product was put into a metal mold of a rectangular parallelopiped with an opening side surface of 250 mm×150 mm and pressed under a condition of 120° C.×25 kgw/cm$^2$ to obtain a porous molded sheet of a rectangular parallelopiped.

By changing the amount of the mixture to be filled in the mold, the molded sheets having thicknesses of 6.7 mm, 7 mm and 7.5 mm were, respectively, obtained from kneaded products with the respective blend ratios as identified in Table 1. Depending upon the thickness, each molded sheet was cut so that the width and length of the molded sheet would in a ratio of length:width:thickness of 140:100:8. Thus, ion exchangers 1 to 9 were obtained. When immersed in pure water at room temperature for 8 hours, these ion exchangers swelled in substantially the same proportion in the length, width and thickness directions and reached an equilibrium state. The increase in the length over the original length is shown as the swelling rate (%).

TABLE 1

| Ion exchanger | Amount of binder (wt %) | Size (mm) | Swelling rate (%) |
| --- | --- | --- | --- |
| 1 | 5 | 117 × 84 × 6.7 | 23 |
| 2 | 5 | 123 × 88 × 7 | 22 |
| 3 | 5 | 131 × 94 × 7.5 | 23 |
| 4 | 2 | 117 × 84 × 6.7 | 26 |
| 5 | 2 | 123 × 88 × 7 | 27 |
| 6 | 2 | 131 × 94 × 7.5 | 25 |
| 7 | 1 | 117 × 84 × 6.7 | 27 |
| 8 | 1 | 123 × 88 × 7 | 28 |
| 9 | 1 | 131 × 94 × 7.5 | 25 |

Measurement of the Swelling Pressure

As shown in FIG. 1, an ion exchanger 13 in a dry state is put into a metal container 11 of a rectangular parallelopiped (bottom width: 100 mm, bottom length: 140 mm), and a metal plate 12 is placed thereon, whereupon the position of a load cell 14 is adjusted so that the forward end of the load cell 14 will contact the metal plate 12 when the ion exchanger 13 swells to a thickness of 8 mm. Namely, the position of the load cell is set so that when the ion exchanger 13 is in a dry state, the sum of the space a between the forward end of the load cell 14 and the metal plate 12 and the thickness b of the ion exchanger 13 will be 8 mm. Then, water is supplied from a water supply inlet 15, and from a load exerted to the load cell 14 when absorption of water reaches equilibrium, the pressure between the ion exchanger 13 and the metal plate 12 was obtained. Then, the volume ratio of the ion exchanger in an operation state to that in a free state i.e. volume in operation-like state/volume in free state×100%, was obtained. These results are shown in Table 2.

TABLE 2

| Ion exchanger | Pressure (kgw/cm$^2$) | Volume ratio (%) |
| --- | --- | --- |
| 1 | 0.22 | 91 |
| 2 | 1.10 | 79 |
| 3 | 4.51 | 65 |
| 4 | 0.43 | 85 |
| 5 | 1.95 | 74 |
| 6 | 6.52 | 61 |
| 7 | 0.47 | 83 |
| 8 | 2.06 | 72 |
| 9 | 6.68 | 59 |

Evaluation by an Electrodialyzer

Figure 2:
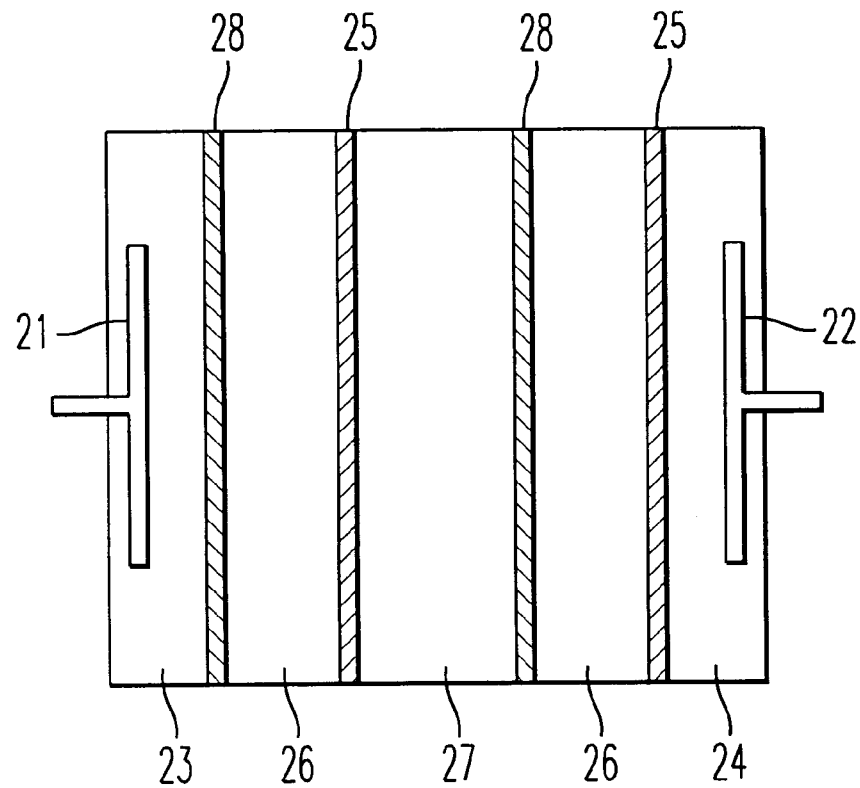
FIG. 2 is a view illustrating the construction of an electrodialyzer used in Test Example.

One of ion exchangers 1 to 9 was put in a demineralizing compartment 27 of an electrodialyzer having a construction as shown in FIG. 2 and clamped to a prescribed size. The shape of the demineralizing compartment 27 was a rectangular parallelopiped, whereby the length in the water flow direction was 140 mm, the width was 100 mm, and the space between an anion exchange membrane 28 and a cation exchange membrane 25 was 8 mm. In each of two concentrating compartments 26, a spacer net made of polypropylene was inserted, so that even when the ion exchanger in the demineralizing compartment 27 expanded, the space between the anion and cation exchange membranes would not substantially change. Accordingly, also in this demineralizing compartment, the ion exchanger exhibits the same pressure as shown in Table 2. Further, for the purpose of comparison, as ion exchanger 10, a molded product of 111 mm×79.4 mm×6.3 mm prepared in the same manner as ion exchangers 1 to 9 and having a binder amount of 2 wt %, was permitted to absorb water adequately and adjusted to have the same size as the demineralizing compartment 27, and such a molded sheet was accommodated in the demineralizing compartment 27.

Then, an electric current of 1.0 A was conducted under the same condition, after supplying 0.18 l/hr of water having an electrical conductivity of about 10 $\mu$S/cm to the demineralizing compartment, 20 l/hr of water having an electrical conductivity of about 1 mS/cm to the concentrating compartments 26 and 1 l/hr of water having an electrical conductivity of about 200 $\mu$S/cm to the anode compartment 24 and the cathode compartment 21 for one hour. The dialyzer was continuously operated for 40 hours, and when the operation was stabilized, the flow rate in the demineralizing compartment was adjusted to 28.8 l/hr, whereupon the pressure loss at the upper and the lower end portions of the demineralizing compartment of the electrodialyzer, the electrical conductivity of deionized water discharged from the demineralizing compartment and the resistivity of the demineralizing compartment, were measured. The results are shown in Table 3. In FIG. 2, reference numeral 21 indicates a cathode, and numeral 22 indicates an anode.

TABLE 3

| Ion exchanger | Pressure loss (kgw/cm$^2$) | Electrical conductivity of deionized water ($\mu$s/cm) | Resistivity of demineralizing compartment ($\Omega$cm) |
| --- | --- | --- | --- |
| 1 | 0.08 | 0.481 | 520 |
| 2 | 0.12 | 0.368 | 330 |
| 3 | 0.18 | 0.213 | 210 |
| 4 | 0.10 | 0.439 | 450 |
| 5 | 0.14 | 0.327 | 300 |
| 6 | 0.20 | 0.200 | 120 |
| 7 | 0.10 | 0.436 | 360 |
| 8 | 0.14 | 0.320 | 280 |
| 9 | 0.21 | 0.197 | 110 |
| 10 | 0.02 | 2.12 | 1350 |

With ion exchangers 1 to 9, deionized water of a high purity was obtained constantly, and the resistivity was low. Further, such a tendency was observed that with an ion exchanger having a higher pressure shown in Table 2, the properties were better. Whereas, with ion exchanger 10, the purity of deionized water was not high. From the measurement of the pressure loss, it was found that spaces were formed between the ion exchangers and the compartment frames or between the ion exchangers and the ion exchange membranes, towards the outlet from the inlet of each demineralizing compartment.

EXAMPLE 1

A sulfonic acid type (H-type) cation exchange resin having a particle size of from 400 to 600 $\mu$m and an ion exchange capacity of 4.5 meq/g dry resin (Diaion SK-1B, tradename, manufactured by Mitsubishi Chemical Corporation) and a quaternary ammonium salt type (OH-type) anion exchange resin having a particle size of from 400 to 600 $\mu$m and an ion exchange capacity of 3.5 meq/g dry resin (Diaion SA-10A, tradename, manufactured by Mitsubishi Chemical Corporation) were subjected to hot air drying at a temperature of 50° C. to bring the water content to 8 wt % and then mixed in a ratio of cation exchange resin/anion exchange resin=44/56 (weight ratio in a dried state) to obtain a mixture having an ion exchange capacity ratio of 50/50. This dried ion exchange resin mixture was packed into each demineralizing compartment of an electrodialyzer wherein the thickness of the demineralizing compartment was 1.2 cm and the thickness of a concentrating compartment having a spacer net made of polypropylene (thickness: 0.2 cm) was 0.2 cm, to a volume packing ratio of 60%. After supplying water for 60 minutes and electric current conducting pretreatment for 24 hours, the resistivity in water with 10 $\mu$S/cm was measured and found to be 1051 $\Omega$·cm at a current density of 0.0025 A/cm$^2$. Using such an electrodialyzer shown in FIG. 3, production of deionized water was carried out as follows. The electrodialyzer was the one consisting of a filter press type dialyzer having cation exchange membranes (strongly acidic heterogeneous membranes, thickness: 500 $\mu$m, ion exchange capacity: 2.7 meq/g dry resin) and anion exchange membranes (strongly basic heterogeneous membranes, thickness: 500 $\mu$m, exchange capacity: 2.1 meq/g dry resin) alternately arranged and clamped via demineralizing compartment frames (made of polypropylene having a thickness of 1.2 cm) and concentrating compartment frames (made of polypropylene having a thickness of 0.2 cm) and having an effective surface area of 507 cm$^2$ (width: 13 cm, length: 39 cm)×5 pairs of the demineralizing compartment and the concentrating compartment.

Figure 4:
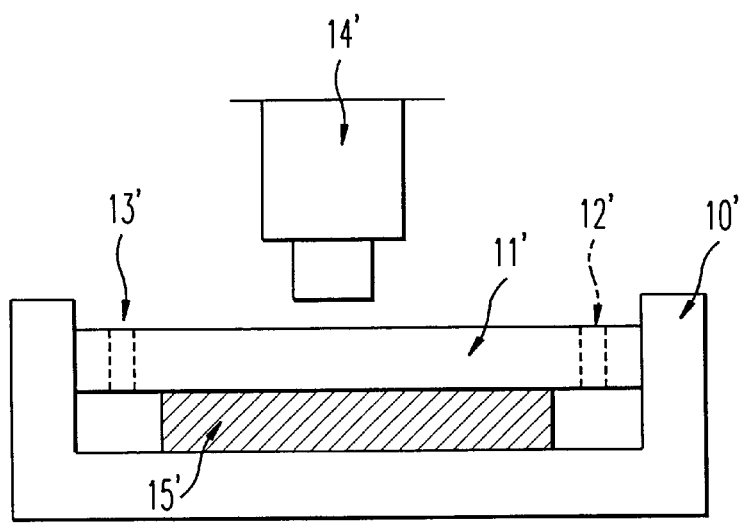
FIG. 4 is a view illustrating an apparatus used for measuring the pressure formed by supplying water to a dried ion exchanger in Examples.

Using water having an electrical conductivity of 5 $\mu$S/cm as feed water, demineralization was carried out at a current density of 0.004 A/cm$^2$ (voltage=5 V per unit cell), whereby treated water having an electrical conductivity of 0.062 $\mu$S/cm was obtained constantly at a production rate of 0.4 m$^3$/hr. In this case, the effective surface area of the membrane per 1 m$^3$/hr of produced water was 1.27 m$^2$. After the measurement, the ion exchange resin was taken out from the demineralizing compartments, and the volume of the ion exchange resin mixture in a free state was measured and found to be 122% of the volume of the demineralizing compartments. Further, using the measuring apparatus as shown in FIG. 4, the same dried ion exchanger as in this Example was put in the metal container 10' in the same volume packing ratio, and water was supplied, whereupon the pressure formed was measured and found to be 2.1 kg/cm$^2$. In FIG. 4, reference numeral 11' is a metal plate, numeral 12' a water supply inlet, numeral 13' a water discharge outlet, numeral 14' a load cell and numeral 15' a dried ion exchanger.

EXAMPLE 2

A sodium sulfonate type (Na-type) cation exchange resin having a particle size of from 400 to 600 $\mu$m and an ion exchange capacity of 4.5 meq/g dry resin (Diaion SK-1B, tradename, manufactured by Mitsubishi Chemical Corporation) and a quaternary ammonium salt type (Cl-type) a nion exchange resin having a particle size of from 400 to 600 $\mu$m and an ion exchange capacity of 3.5 meq/g dry resin (Diaion SA-10A, tradename, manufactured by Mitsubishi Chemical Corporation) were subjected to hot air drying at a temperature of 50° C. to bring the water content to 8 wt % and then mixed in a ratio of cation exchange resin/anion exchange resin=44/56 (weight ratio in a dried state) to obtain a mixture having an ion exchange capacity ratio of 50/50.

To this mixture, 3 wt % of linear low density polyethylene (Affinity SM-1300, tradename, manufactured by Dow Chemical) was mixed based on the product obtained and kneaded at a temperature of from 120 to 130° C. The obtained kneaded product was thermally formed by a flat plate press at 130° C. to obtain a porous ion exchanger sheet having a thickness of 0.6 cm. The porosity of continuous pores in this porous sheet was 23 vol %. This porous ion exchanger sheet was accommodated into the demineralizing compartments of an electrodialyzer having the same construction as in Example 1 except that the thickness of each demineralizing compartment was changed to 0.8 cm, at a volume packing ratio of 54%. After supplying water for 60 minutes and electric current conducting pretreatment for 24 hours, the resistivity in water with 10 $\mu$S/cm was measured and found to be 1164 $\Omega$·cm at a current density of 0.0025 A/cm$^2$.

After the measurement of the resistivity, production of deionized water was carried out. As the electrodialyzer, the same electrodialyzer as used in Example 1 except for the thickness of the demineralizing compartments, was used. Using water having an electrical conductivity of 5 $\mu$S/cm as feed water, demineralization was carried out at a current density of 0.004 A/cm$^2$ (voltage=5 V per unit cell), whereby treated water having an electrical conductivity of 0.060 $\mu$S/cm was obtained constantly with a production rate of 0.45 m$^3$/hr. In this case, the effective surface area of the membrane per 1 m$^3$/hr of produced water was 1.13 m$^2$. After the operation, the ion exchanger sheet was taken out from the demineralizing compartment, and the volume in a free state was measured and found to be 111% of the volume of the demineralizing compartment. Further, the same dried ion exchanger sheet as in this Example was put into the metal container 10' of the measuring apparatus shown in FIG. 4 at the same volume packing ratio, and water was supplied, whereupon the pressure formed was measured and found to be 1.2 kg/cm$^2$.

EXAMPLE 3

A sodium sulfonate type (Na-type) cation exchange resin having a particle size of from 400 to 600 $\mu$m and an ion exchange capacity of 4.5 meq/g dry resin (Diaion SK-1B, tradename, manufactured by Mitsubishi Chemical Corporation) and a quaternary ammonium salt type (Cl-type) anion exchange resin having a particle size of from 400 to 600 $\mu$m and an ion exchange capacity of 3.5 meq/g dry resin (Diaion SA-10A, tradename, manufactured by Mitsubishi Chemical Corporation) were subjected to hot air drying at a temperature of 50° C. to bring the water content to 8 wt %. To the respective ion exchange resins, 3 wt % of linear low density polyethylene (Affinity SM-1300, tradename, manufactured by Dow Chemical) was mixed based on the product obtained and kneaded at a temperature of from 120 to 130° C. The obtained respective kneaded products were thermally formed by a flat plate press at a temperature of 130° C. to obtain a porous cation exchanger sheet and a porous anion exchanger sheet each having a thickness of 0.6 cm. The porosity of continuous pores of the obtained porous cation exchanger sheet was 24 vol %, and the porosity of the porous anion exchanger sheet was 23 vol %.

Figure 5:
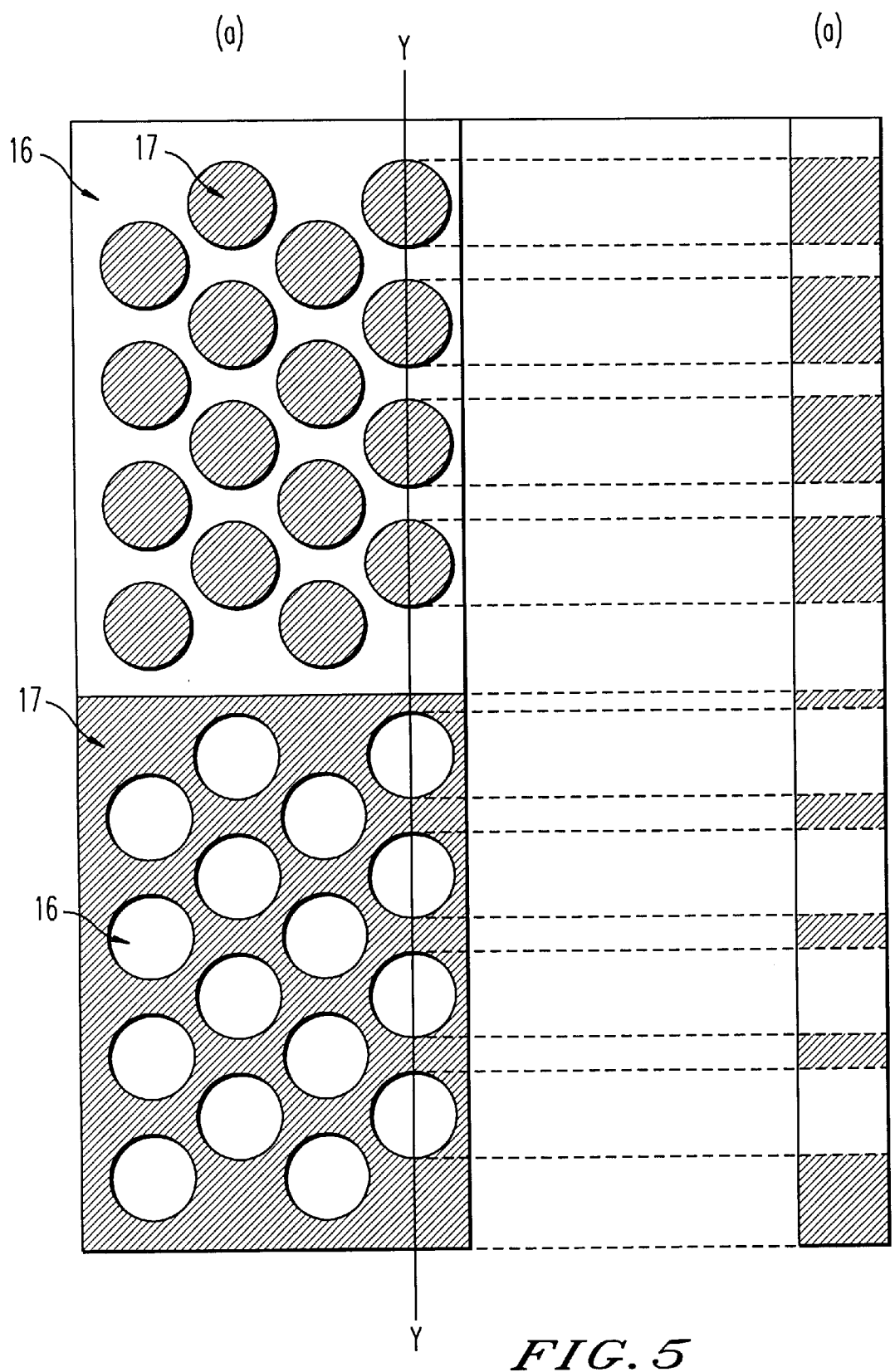
FIG. 5 is a view illustrating an embodiment of a porous body of ion exchange resins wherein porous cation and anion exchanger sheets are arranged in a sea-island pattern (as used in Example 3).

Using these two porous ion exchanger sheets, a combination of domains (regions) of the cation exchanger and domains (regions) of the anion exchanger in the pattern as shown in FIGS. 5(a) and 5(b), was prepared and then accommodated into the demineralizing compartments with a thickness of 0.8 cm of the same electrodialyzer as used in Example 2 at a volume packing ratio of 66%. FIG. 5(a) shows a plan view, and FIG. 5(b) is a cross sectional view taken along line Y—Y in FIG. 5(a). In FIG. 5, reference numeral 16 indicates an anion exchanger domain, and numeral 17 indicates a cation exchanger domain. After supplying water for 60 minutes and electric current conducting pretreatment for 24 hours, the resistivity in water with 10 $\mu$S/cm was measured and found to be 911 $\Omega$·cm at a current density of 0.0025 A/cm$^2$.

After the measurement of the resistivity, production of deionized water was carried out. As the electrodialyzer, the same electrodialyzer as used in Example 2 was used. Using water having an electrical conductivity of 5 $\mu$S/cm as feed water, demineralization was carried out at a current density of 0.004 A/cm$^2$ (voltage=5 V per unit cell), whereby deionized water having an electrical conductivity of 0.057 $\mu$S/cm was obtained constantly at a production rate of 0.47 m$^3$/hr. In this case, the effective surface area of the membrane per 1 m$^3$/hr of produced water was 1.08 m$^2$. After the measurement, the ion exchange resin was taken out from the demineralizing compartment and the volume was measured and found to be 134% of the volume of the demineralizing compartment. Further, the same dried ion exchanger as in this Example was put into the metal container 10' of the measuring apparatus as shown in FIG. 4, and water was supplied, whereupon the pressure formed was measured and found to be 4.2 kg/cm$^2$.

EXAMPLE 4

A sodium sulfonate type (Na-type) cation exchange resin having a particle size of from 400 to 600 $\mu$m and an ion exchange capacity of 4.5 meq/g dry resin (Diaion SK-1B, tradename, manufactured by Mitsubishi Chemical Corporation) and a quaternary ammonium salt type (Cl-type) anion exchange resin having a particle size of from 400 to 600 $\mu$m and an ion exchange capacity of 3.5 meq/g dry resin (Diaion SA-10A, tradename, manufactured by Mitsubishi Chemical Corporation) were subjected to hot air drying at a temperature of 50° C. to bring the water content to 8 wt %. To the respective ion exchange resins, 3 wt % of 1,2-polybutadiene (RB-820, manufactured by Japan Synthetic Rubber Co., Ltd.) was mixed based on the product obtained and kneaded at a temperature of from 120 to 130° C. The obtained respective kneaded products were thermally formed by a flat plate press at a temperature of 130° C. to obtain a porous cation exchanger sheet and a porous anion exchanger sheet each having a thickness of 0.6 cm. The porosity of continuous pores of the obtained porous cation exchanger sheet was 24 vol %, and the porosity of the porous anion exchanger sheet was 23 vol %.

Figure 6:
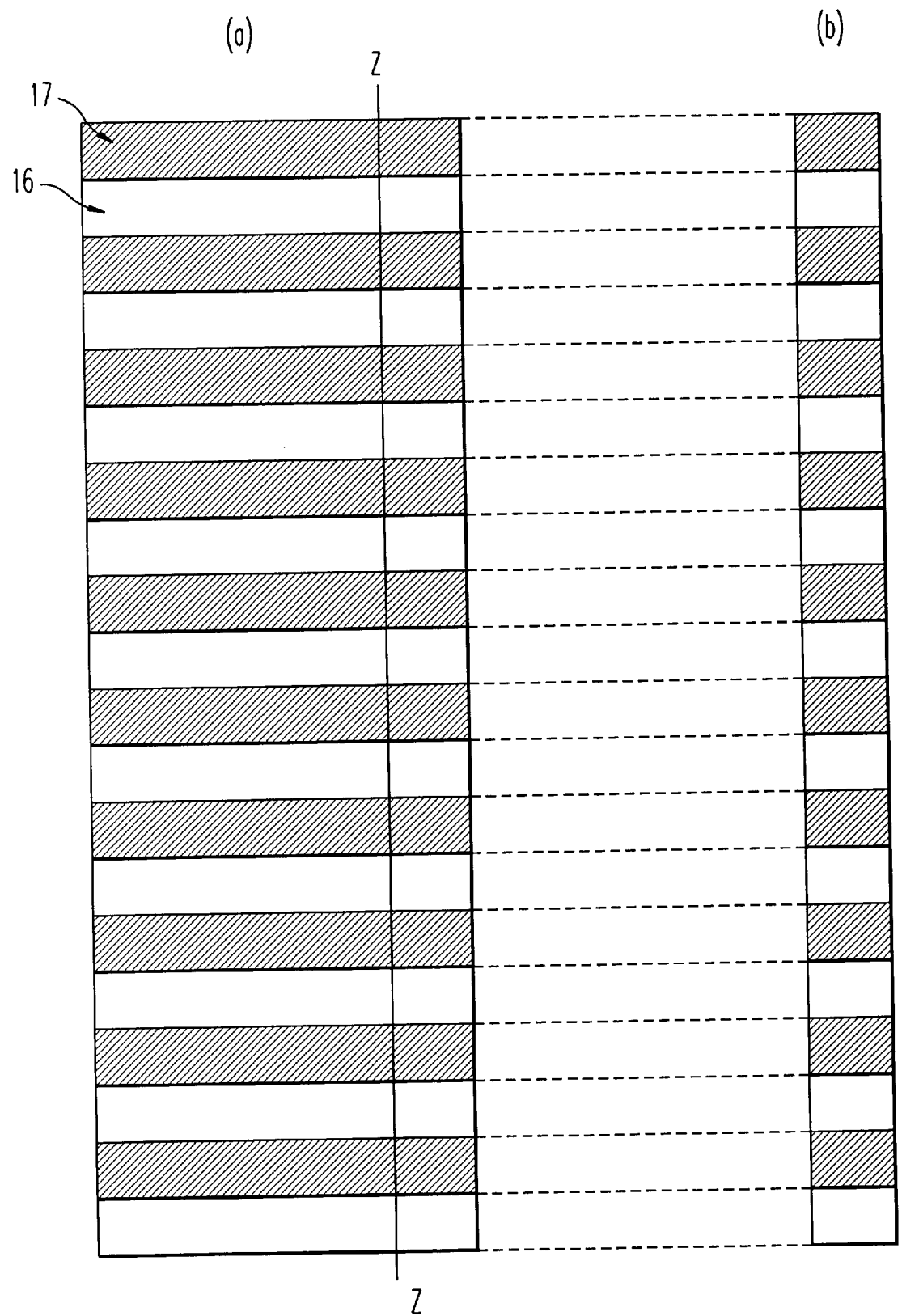
FIG. 6 is a view illustrating an embodiment of a porous body of ion exchange resins wherein porous cation and anion ion exchanger sheets are arranged in a multi-layer pattern (as used in Example 4).

Using these two porous ion exchanger sheets, a combination of domains (regions) of the cation exchanger and domains (regions) of the anion exchanger in the pattern as shown in FIGS. 6(a) and 6(b), was prepared and packed into the demineralizing compartments having a thickness of 0.8 cm at a volume packing ratio of 55%. FIG. 6(a) indicates a plan view, and FIG. 6(b) is a cross sectional view taken along line Z—Z in FIG. 6(a). In FIG. 6, reference numeral 16 indicates an anion exchanger domain, and numeral 17 indicates a cation exchanger domain. After supplying water for 60 minutes and electric current conducting pretreatment for 24 hours, the resistivity in water with 10 $\mu$S/cm was measured and found to be 1206 $\Omega$·cm at a current density of 0.0025 A/cm$^2$, which was lower than 1362 Ω·cm in a case where non-dried regenerated type ion exchange resins having the same blend ratio were put into the cell and measured.

After the measurement of the resistivity, production of deionized water was carried out. As the electrodialyzer, the same as used in Example 2 was employed. Using water having an electrical conductivity of 5 μS/cm as feed water, demineralization was carried out at a current density of 0.004 A/cm$^2$ (voltage=5 V per unit cell), whereby treated water having an electrical conductivity of 0.057 μS/cm was obtained constantly at a production rate of 0.46 m$^3$/hr. In this case, the effective surface area of the membrane per 1 m$^3$/hr of produced water was 1.10 m$^2$. After the measurement, the ion exchange resin was taken out from the demineralizing compartment, and the volume was measured and found to be 113% of the volume of the demineralizing compartment. Further, the same dried ion exchanger as in this Example was put into the metal container 10' of the measuring apparatus as shown in FIG. 4, and water was supplied, whereupon the pressure formed was measured and found to be 1.3 kg/cm$^2$.

COMPARATIVE EXAMPLE

A sulfonic acid type (H-type) cation exchange resin having a particle size of from 400 to 600 μm and an ion exchange capacity of 4.5 meq/g dry resin (Diaion SK-1B, tradename, manufactured by Mitsubishi Chemical Corporation) and a quaternary ammonium salt type (OH-type) anion exchange resin having a particle size of from 400 to 600 μm and an ion exchange capacity of 3.5 meq/g dry resin (Diaion SA-10A, tradename, manufactured by Mitsubishi Chemical Corporation) were regenerated with hydrochloric acid and an aqueous sodium hydroxide solution, and then mixed in a ratio of cation exchange resin/anion exchanger resin=40/60 (volume ratio in a wet state) to obtain a mixture having an ion exchange capacity ratio of 50/50.

This regenerated ion exchange resin mixture in a wet state, was packed into the demineralizing compartments of an electrodialyzer having the same construction as in Example 1 except that the width of each demineralizing compartment was 0.8 cm, at a volume packing ratio of 100%. After supplying water for 60 minutes and electric current conducting pretreatment for 24 hours, the resistivity in water with 10 μS/cm was measured and found to be 1362 Ω·cm at a current density of 0.0025 A/cm$^2$.

After the measurement of the resistivity, production of deionized water was carried out. As the electrodialyzer, the same as used in Example 1 except that the thickness of the demineralizing compartments was different, was used. Using water having an electrical conductivity of 5 μS/cm as feed water, demineralization was carried out at a current density of 0.005 A/cm$^2$ (voltage=5 V per unit cell), whereby treated water having an electrical conductivity of 0.07 μS/cm was obtained only at such a small production rate as 0.04 m$^3$/hr. The amount of water treated could not be increased, since if the amount of water treated was increased, the electrical conductivity increased. In this case, the effective surface area of the membrane per 1 m$^3$/hr of produced water was as large as 12.68 m$^2$.

According to the apparatus for producing deionized water of the present invention, the contact of the ion exchanger particles with one another and with the ion exchange membranes, is increased as accommodated in the demineralizing compartments of an electrodialyzer, whereby the resistivity can be reduced, and the thickness of the demineralizing compartments can be made large. Accordingly, it is possible to obtain an apparatus having a large production rate of deionized water with a relatively small effective surface area of the membrane.

What is claimed is:

1. An apparatus for producing deionized water comprising an electrodialyzer having cation exchange membranes and anion exchange membranes alternatively arranged between a cathode and an anode to form demineralizing compartments and concentrating compartments and ion exchangers accommodated in the demineralizing compartments, wherein a pressure of from 0.1 to 20 kg/cm$^2$ is exerted between the ion exchangers accommodated in the demineralizing compartments and the cation exchange membranes and anion exchange membranes defining the demineralizing compartments, and wherein said pressure is formed by mechanically reducing the volume of the demineralizing compartments.

2. The apparatus for producing deionized water according to claim 1, wherein the thickness of each demineralizing compartment is from 0.7 to 30 cm.

3. The apparatus for producing deionized water according to claim 1, wherein in each concentrating compartment, a spacer is arranged to maintain the thickness of the compartment.

4. The apparatus for producing deionized water according to claim 1, wherein the ion exchangers accommodated in the demineralizing compartments are a porous body having a cation exchange resin, an anion exchange resin or a mixture thereof bonded by a binder polymer.

5. The apparatus for producing deionized water according to claim 1, wherein the ion exchangers accommodated in the demineralizing compartments are constituted by a combination of domains of at least one cation exchanger and domains of at least one anion exchanger.

6. The apparatus for producing deionized water according to claim 1, wherein the ion exchangers accommodated in the demineralizing compartments are granular cation exchange resin, granular anion exchange resin or the mixture thereof.

7. The apparatus for producing deionized water according to claim 6, wherein the ion exchangers accommodated in the demineralizing compartments are constituted by a combination of domains of a granular cation exchange resin and domains of a granular anion exchange resin.

8. A method for producing deionized water, which comprises supplying a water to be treated to the demineralizing compartments of the apparatus for producing deionized water as defined in claim 1 and conducting an electric current at a current density of from 0.0001 to 0.05 A/cm$^2$.

9. An apparatus according to claim 1, wherein a spacer is provided in the demineralizing compartments and said spacer is compressed by pressure exerted from outside said demineralizing compartments.

10. An apparatus according to claim 9 wherein the volume of the demineralizing compartments is reduced by 5 to 60 vol %.

11. An apparatus according to claim 9 wherein said spacer is a foam sheet.

* * * * *